(12) United States Patent
Ben-David et al.

(10) Patent No.: US 8,451,823 B2
(45) Date of Patent: May 28, 2013

(54) DISTRIBUTED OFF-LINE VOICE SERVICES

(75) Inventors: Shay Ben-David, Haifa (IL); Ron Hoory, Haifa (IL); Alexey Roytman, Yokne'am Ilit (IL); Zohar Sivan, Zichron Yaakov (IL); James Jude Sliwa, Raleigh, NC (US)

(73) Assignee: Nuance Communications, Inc., Burlington, MA (US)

( * ) Notice: Subject to any disclaimer, the term of this patent is extended or adjusted under 35 U.S.C. 154(b) by 1688 days.

(21) Appl. No.: 11/301,434

(22) Filed: Dec. 13, 2005

(65) Prior Publication Data

US 2007/0133518 A1    Jun. 14, 2007

(51) Int. Cl.
*H04L 12/66* (2006.01)
*H04M 1/64* (2006.01)
*G10L 15/00* (2006.01)

(52) U.S. Cl.
USPC .................. 370/352; 379/88.01; 704/231

(58) Field of Classification Search
USPC .............. 370/352; 379/907, 88.01; 704/231
See application file for complete search history.

(56) References Cited

U.S. PATENT DOCUMENTS

| | | | |
|---|---|---|---|
| 5,875,436 A | 2/1999 | Kikinis | |
| 6,175,822 B1 | 1/2001 | Jones | |
| 6,785,654 B2 | 8/2004 | Cyr et al. | |
| 6,807,257 B1 | 10/2004 | Kurganov | |
| 2003/0101054 A1* | 5/2003 | Davis et al. | 704/235 |
| 2004/0088162 A1 | 5/2004 | He et al. | |
| 2005/0065790 A1* | 3/2005 | Yacoub | 704/231 |
| 2005/0276391 A1* | 12/2005 | Ibbotson et al. | 379/88.01 |

FOREIGN PATENT DOCUMENTS

| | | |
|---|---|---|
| CN | 1372664 A | 10/2002 |
| CN | 1599398 A | 3/2005 |
| JP | 2003067177 | 3/2003 |
| WO | WO 0138994 A1 | 5/2001 |
| WO | WO2004053837 | 6/2004 |
| WO | WO2005006307 | 1/2005 |
| WO | WO 2005/013596 A1 | 2/2005 |

OTHER PUBLICATIONS

IBM, WebSphere Voice Server V4.2 for WebSphere Voice Response AIX Application Development with State Tables Guide, Dec. 2003, IBM, Second Edition, G210-1562-01, Archived Nov. 23 2004 web.archive.org/web/20041123020220/www-306.ibm.com/software/pervasive/voice_server/library/publibfp.dhe.ibm.com/epubs/pdf/21015621.pdf.*

IBM, WebSphere Voice Server V4.2 for WebSphere Voice Response AIX Administrator's Guide, Dec. 2003, IBM, Second Edition, G210-1581-01, Archived Nov. 23, 2004 web.archive.org/web/20041123020220/www-306.ibm.com/software/pervasive/voice_server/library/publibfp.dhe.ibm.com/epubs/pdf/21015611.pdf.*

(Continued)

*Primary Examiner* — Asad Nawaz
*Assistant Examiner* — Nicholas Jensen
(74) *Attorney, Agent, or Firm* — Wolf, Greenfield & Sacks, P.C.

(57) ABSTRACT

A voice processing system includes a real-time voice server, which is arranged to process real-time voice processing tasks for clients of the system. A gateway processor is arranged to accept from a client a request to perform an off-line voice processing task, to convert the off-line voice processing task into an equivalent real-time voice processing task, to invoke the voice server to process the equivalent real-time voice processing task, and to output a result of the equivalent real-time voice processing task.

41 Claims, 3 Drawing Sheets

OTHER PUBLICATIONS

WebSphere® Voice Server (WVS), Automatic Speech Recognition (ASR) and Text-To-Speech (TTS) software, details available at www-306.ibm.com/software/pervasive/voice_server.

Telisma (Paris, France) networked speech recognition software (teliSpeech), details available at telisma.com/overviewtelispeech.html.

Oran, "Requirements for Distributed Control of ASR, SI/SV and TTS Resources," published as an Internet Draft by the Internet Engineering Task Force (draft-ietf-speechsc-reqts-07), May 2005. Available at www.ietf.org/internet-drafts/_draft-ietf-speechsc-reqts-07.txt.

Shanmugham , "Media Resource Control Protocol Version 2 (MRCPv2)," published as IETF Internet draft draft-ietf-speechsc-mrcpv2-08, Oct. 2005, available at ietf.org/internet-drafts/draft-shanmugham-mrcp-07.txt.

Schulzrinne et al., "A Transport Protocol for Real-Time Applications," published as IETF Request for Comments (RFC) 3550, Jul. 2003, available at www.ietf.org/rfc/rfc3550.txt.

W. Holmes in "Speech Synthesis and Recognition," Taylor & Francis, Second Edition, Dec. 2001, pp. 196-202.

IBM Transcription Portal, Alphaworks alphaworks.ibm.com/tech/transportlet.

Natural Language Semantics Markup Language for the Speech Interface Framework (NLSML) w3.org/TR/nl-spec/.

* cited by examiner

DISTRIBUTED OFF-LINE VOICE SERVICES

FIELD OF THE INVENTION

The present invention relates generally to voice processing systems, and particularly to methods and systems for distributed off-line voice transcription and synthesis using real-time voice servers.

BACKGROUND OF THE INVENTION

Voice servers are used in a variety of voice processing applications. For example, IBM Corp. (Armonk, N.Y.) offers the WebSphere® Voice Server (WVS), which includes both Automatic Speech Recognition (ASR) and Text-To-Speech (TTS) software used for deploying conversational solutions for organizations. Further details regarding this product are available at www-306.ibm.com/software/pervasive/voice_server. As another example, Telisma (Paris, France) offers networked speech recognition software called teliSpeech. Details regarding this product are available at www.telisma.com/overviewtelispeech.html.

Communication protocols supporting the control of network elements that perform ASR, speaker identification and/or verification (SI/SV), and TTS functions are defined, for example, by Oran in "Requirements for Distributed Control of ASR, SI/SV and TTS Resources," published as an Internet Draft by the Internet Engineering Task Force (draft-ietf-speechsc-reqts-07), May 2005. This Internet draft is available at www.ietf.org/internet-drafts/draft-ietf-speechsc-reqts-07.txt. The draft defines a Speech Services Control (SPEECHSC) framework that supports the distributed control of speech resources.

One of the control protocols implementing the SPEECHSC framework is the Media Resource Control Protocol (MRCP), which is described by Shanmugham in "Media Resource Control Protocol Version 2 (MRCPv2)," published as IETF Internet draft draft-ietf-speechsc-mrcpv2-08, October 2005. This draft is available at www.ietf.org/internet-drafts/draft-ietf-speechsc-mrcpv2-08.txt.

Whereas MRCP is a control protocol, in some applications the voice data itself is transmitted using the real-time transport protocol (RTP). RTP is described in detail by Schulzrinne et al. in "A Transport Protocol for Real-Time Applications," published as IETF Request for Comments (RFC) 3550, July 2003. This RFC is available at www.ietf.org/rfc/rfc3550.txt

SUMMARY OF THE INVENTION

There is therefore provided, in accordance with an embodiment of the present invention, a voice processing system, including a real-time voice server, which is arranged to process real-time voice processing tasks for clients of the system. A gateway processor is arranged to accept from a client a request to perform an off-line voice processing task and to convert the off-line voice processing task into an equivalent real-time voice processing task. The gateway processor invokes the voice server to process the equivalent real-time voice processing task, and then outputs a result of the equivalent real-time voice processing task.

Other embodiments of the present invention provide methods and computer software products for voice processing.

The present invention will be more fully understood from the following detailed description of the embodiments thereof, taken together with the drawings in which:

DETAILED DESCRIPTION OF EMBODIMENTS

Overview

Many voice processing applications use voice servers, which provide distributed Automatic Speech Recognition (ASR) and/or Text-To-Speech (TTS) conversion services to clients. Some known voice server architectures and the protocols they use, such as the products and protocols cited above, are geared towards real-time, conversational applications. For a number of reasons detailed below, such voice servers and protocols are generally less suited for off-line applications, such as automatic transcription services.

In order to overcome these limitations, embodiments of the present invention provide methods and systems for carrying out off-line voice processing applications using real-time voice servers. In some embodiments, a gateway processor operates in conjunction with a real-time voice server. The gateway processor mediates between off-line clients and the voice server, substantially converting off-line processing tasks requested by these clients to equivalent real-time tasks. The real-time tasks are processed by the voice server, and the results are sent to the requesting clients or published by the gateway.

The disclosed system configurations are inherently distributed and highly scalable. In addition to automatic transcription and off-line TTS conversion, the disclosed methods and systems can also be used to implement other off-line ASR, speaker identification (SI) and/or speaker verification (SV) functions.

By using the gateway processor, off-line voice processing applications can be carried out using known voice servers, architectures and protocols with minimal or no modifications. In particular, as will be shown below, the voice server is typically not required to perform media or protocol conversions.

System Description

Figure 1:
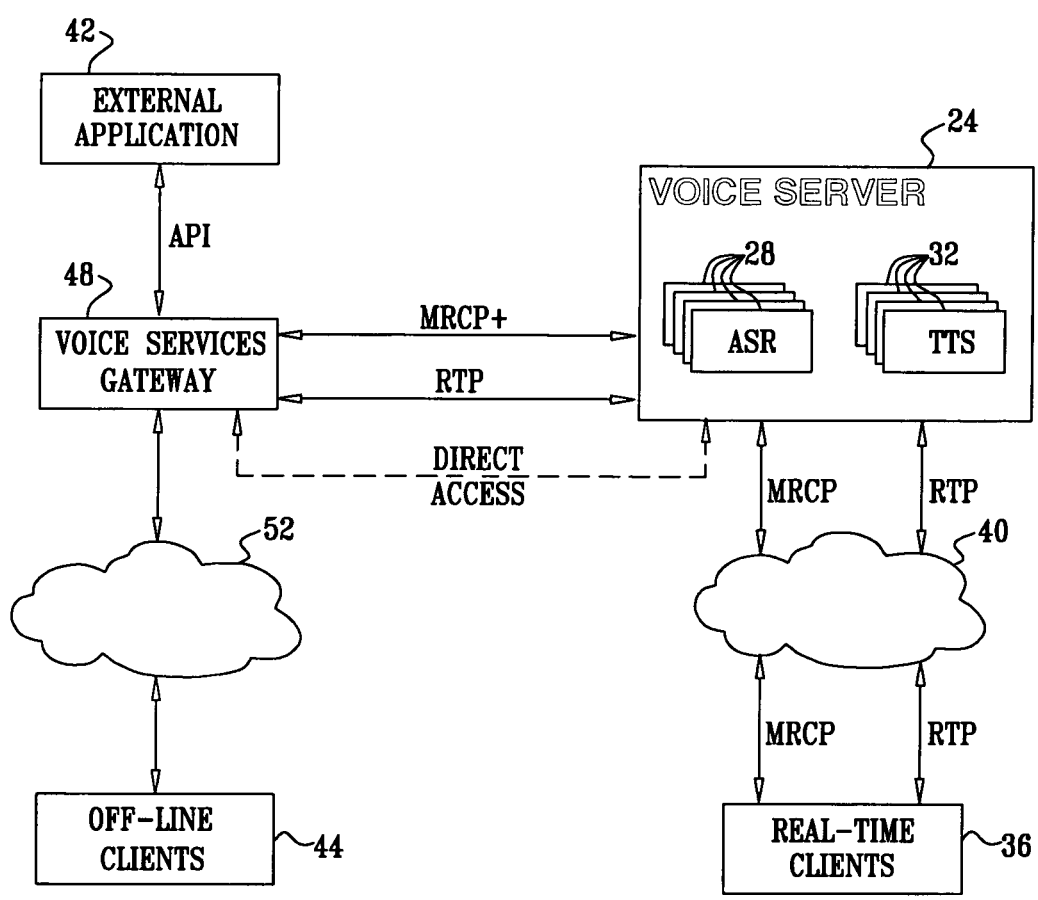
FIG. 1 is a block diagram that schematically illustrates a system for automatic voice transcription and synthesis, in accordance with an embodiment of the present invention.

FIG. 1 is a block diagram that schematically illustrates a system 20 for automatic voice transcription and synthesis, in accordance with an embodiment of the present invention. System 20 is arranged in a client-server configuration, in which a voice server 24 provides voice processing services to clients. Voice server 24 comprises at least one automatic speech recognition (ASR) module 28 and/or at least one text-to-speech (TTS) module 32. Using the ASR and TTS modules, voice server 24 performs voice recognition and/or speech synthesis tasks responsively to client requests.

The ASR and TTS modules may apply any suitable speech recognition and synthesis methods known in the art. In some embodiments, voice server 24 comprises a known real-time voice server product, such as the IBM and Telisma products cited above.

Some of the clients of system 20 comprise real-time clients 36, whose interaction with voice server 24 is interactive, or conversational by nature. For example, system 20 may run a banking application, in which real-time clients 36 check the status of their bank accounts and perform financial transactions using voice-activated menus. In such a system, ASR modules 28 in voice server 24 analyze the voice commands given by the clients, and TTS modules 32 synthesize the text played to the clients. In alternative embodiments, voice server 24 may perform any other conversational interaction with real-time clients 36.

In some embodiments, real-time clients 36 comprise clients that use a public switched telephone network (PSTN) or other telephony network to access system 20. In some embodiments, the interconnection between the PSTN and system 20 is performed using PSTN/MRCP gateways (not shown in the figure). Additionally or alternatively, some of clients 36 may use voice-over-IP (VoIP) connections. Clients 36 communicate with voice server 24 using media and/or control protocols, such as RTP and MRCP cited above.

In some embodiments, real-time clients 36 are connected to server 24 via a network 40, typically comprising an Internet Protocol (IP) network. Depending on the specific application, network 40 may comprise a wide-area network (WAN), such as the Internet, a local-area-network (LAN), or any other suitable network connection.

In some embodiments, system 20 runs an external voice processing application 42, which is off-line rather than real-time by nature. A typical but not limiting example of an off-line application is an automatic voice transcription service provided to off-line clients 44. Many voice applications involve recording and storage of large volumes of voice information. An automatic transcription service automatically converts at least part of this voice data to textual information, accessible to either humans or computers.

For example, many call center applications, especially applications involving financial transactions, record the voice transactions performed with customers and store the recorded voice for future reference or evidence. An automatic transcription application converts some or all of this voice data to textual information, which is accessible to conventional text-based indexing, as well as to search and analysis tools. Another example is an application for automatic closed captioning of television broadcasts. Other examples comprise security applications that perform transcription of intercepted voice communication messages. Alternatively, external application 42 may comprise any other client-server voice processing application, in which the interaction with the clients has off-line rather than real-time characteristics.

In some embodiments, voice-processing application 42 comprises an off-line TTS application that processes textual information, i.e., converts textual information to synthesized speech. For example, a content provider may perform off-line TTS conversion of books, news stories, articles and/or any other textual information. The service provider then offers a service in which off-line clients are allowed to download and listen to the synthesized voice content. A similar approach can also be used by podcasting applications, as are known in the art.

In many cases, however, known voice server architectures and the protocols they support are geared towards real-time, conversational applications and are generally unsuitable for handling off-line applications. For example, known architectures and protocols are often telephony-oriented rather than network-oriented. In some cases, voice servers cannot be directly integrated with external web applications or support direct web access. Voice servers generally have no direct control over the source of the voice media. Functions such as remote download and direct access to a media file are typically not supported. The voice server can access only streaming voice media from a remote source, as is typically performed in conversational real-time applications. Moreover, voice servers often support only a small number of media formats. These formats are used in telephony applications and rarely in the IP/World-Wide-Web world.

In order to overcome these limitations of known voice servers and protocols, system 20 comprises a voice services gateway 48, which mediates between off-line clients 44 (which may comprise clients of transcription and/or TTS applications) and voice server 24. (Although the embodiments described herein mainly address automatic transcription services, these methods and systems can be used to carry out any other off-line voice processing application for off-line clients using a gateway processor operating in conjunction with a voice server. These voice processing applications may comprise ASR functions, TTS functions, or both.) In principle, gateway 48 interacts with off-line clients 44 and converts off-line voice processing tasks requested by these clients to equivalent real-time tasks that are carried out by voice server 24.

In some embodiments, off-line clients 44 communicate with gateway 48 via a network 52, typically comprising an IP network. Network 52 may comprise a wide-area network (WAN), such as the Internet, a local-area-network (LAN), or any other suitable network connection. In some embodiments, clients 44 use hypertext transfer protocol (HTTP) clients or other web-access protocols, such as a Web Services protocol, to access gateway 48.

Gateway 48 communicates with voice server 24 using standard protocols already supported by server 24, so as to minimize or eliminate the modifications needed in server 24 to facilitate off-line applications. In some embodiments, the control protocol used to exchange control messages between gateway 48 and server 24 is extended to include additional optional fields or commands relevant to off-line voice processing. Typically, the extended control protocol maintains backward compatibility with the original protocol.

For example, the transcribed text produced by a transcription application can be augmented with time stamps indicating the timing of each word in the original voice content. These timestamps are useful for synchronizing the text with other media types, such as video. As another example, the control protocol can be extended to comprise commands allowing direct file system access, in addition to streaming-oriented commands. Hereinbelow, the extended MRCP is referred to as MRCP+. Similar extensions can similarly be applied to other control protocols.

Extended control protocols such as MRCP+ can sometimes be used to control real-time applications, as well. For example, in some embodiments, application 42 comprises a real-time transcription application. An exemplary real-time transcription application is a real-time dictation service. Although such applications have real-time characteristics, it is often desirable to control the media involved using an extended control protocol such as MRCP+.

In many practical cases, the ASR process in ASR modules 28 of voice server 24 is faster than the streaming rate of the media provided to the server. Therefore, when using the methods described below, it is often possible to increase the efficiency of voice server 24 by enabling the server to access the entire media content directly, rather than be limited by the real-time streaming rate. A similar argument holds for the generation of synthesized speech by TTS modules 32 of server 24.

The system configuration of FIG. 1 is an exemplary configuration, which is shown purely for the sake of conceptual clarity. Other configurations will be apparent to those skilled in the art after reading the description given herein. For example, a particular gateway 48 may operate in conjunction with two or more voice servers 24. System 20 may carry out any number of external applications 42 simultaneously. System 20 may serve only off-line clients 44 or a mixture of off-line clients 44 and real-time clients 36. Gateway 48 may communicate with server 24 using any media and control protocols supported by the server.

Typically, voice services gateway 48 comprises a general-purpose computer, which is programmed in software to carry out the functions described herein. The software may be downloaded to gateway 48 in electronic form, over a network, for example, or it may alternatively be supplied to the gateway on tangible media, such as CD-ROM. Gateway 48 may be implemented as a standalone unit, or it may alternatively be integrated with voice server 24 or with other components of system 20.

Figure 2:
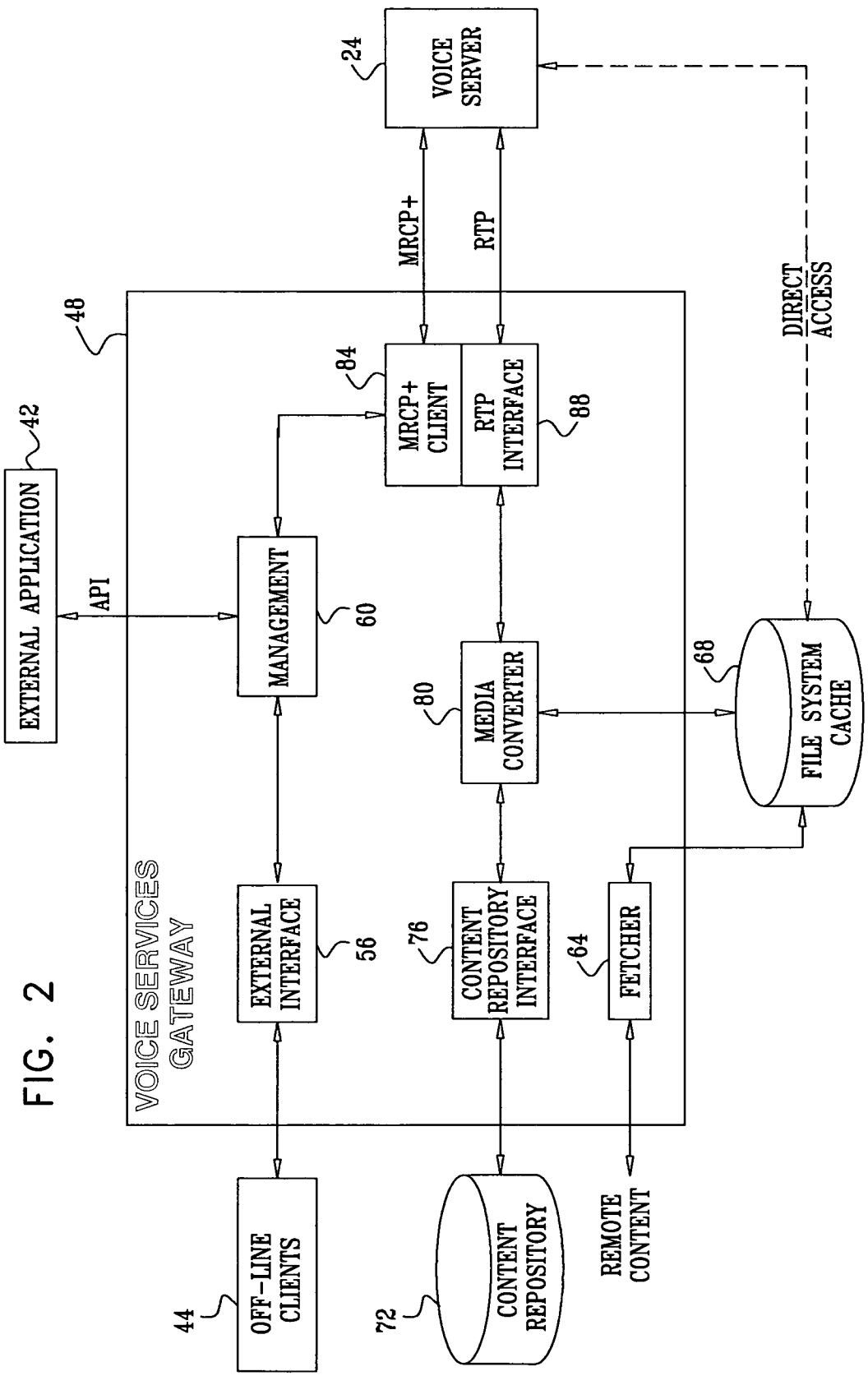
FIG. 2 is a block diagram that schematically illustrates details of a voice services gateway, in accordance with an embodiment of the present invention.

FIG. 2 is a block diagram that schematically illustrates details of voice services gateway 48, in accordance with an embodiment of the present invention. FIG. 2 shows the major structural and functional elements of gateway 48. Exemplary transcription and TTS conversion methods, carried out by gateway 48, are described in detail in FIGS. 3 and 4 further below.

Gateway 48 comprises an external interface 56, which communicates with off-line clients 44. Interface 56 may conform to a known format or to standard guidelines, such as the Enterprise JavaBeans (EJB) interface or the .NET interface guidelines, as are known in the art. A management module 60 manages the operation of gateway 48. In particular, module 60 interacts with external application 42 via a suitable application interface (API).

Gateway 48 comprises one or more content fetchers 64 for fetching remote media content to be used as input by transcription applications, as well as for uploading media content produced by TTS applications. The remote content may be located either internally or externally to system 20. In some cases, fetchers 64 store the fetched remote content and/or the content to be uploaded in a file system cache 68. Cache 68 typically comprises a shared storage resource of the file system used by system 20.

Additionally or alternatively, media content may also be stored in a content repository 72, which comprises a database or other suitable data structure that uses a magnetic disk or other data storage device. Gateway 48 may comprise a content repository interface 76 for exchanging data with content repository 72. Content repository 72 and file system cache 68 are examples of local storage devices that can be used by gateway 48 for temporarily storing media content. Additionally or alternatively, any other suitable local storage device can be used for this purpose.

In some embodiments, additional data and/or metadata associated with the media content may also be stored in the local storage devices along with the media content itself. For example, in a transcription application, the name of the speaker and the time in which the media content was acquired can be stored. The data can then be used, for example, to locate the specific media content or for data mining.

In many practical cases, the conversion of an off-line task into a real-time task involves protocol and/or media format conversion. For example, in some cases, the voice to be processed by voice server 24 is embedded in a higher complexity media (referred to as "rich media"), which comprises additional content grouped with the voice content. Rich media may comprise, for example, a composite video or other multimedia file. In the opposite direction, speech synthesized by voice server 24 should sometimes be embedded in a composite video file or other rich media content.

Gateway 48 comprises a media converter 80, which performs media format and protocol conversions. In particular, media converter 80 extracts the voice content from rich media formats such as video and embeds synthesized speech into higher complexity formats. When an off-line client uses HTTP or other web-access protocol, media converter 80 performs the necessary protocol conversion in order to communicate with the client.

Media converter 80 also formats the voice data to be provided to voice server 24 in accordance with the media protocols supported by the server. In the configuration of FIG. 2, for example, voice server 24 supports RTP for media transfer. Media converter 80 thus formats the voice data as RTP packets.

Gateway 48 comprises an RTP interface 88 that exchanges RTP packets with voice server 24. In parallel, an MRCP+ client 84 formats the control (e.g., signaling) information associated with the voice data in accordance with the extended MRCP protocol and exchanges MRCP+packets with the voice server.

In some embodiments, elements of gateway 48, such as parts of media converter 80, RTP interface 88 and/or MRCP+ client 84 can be implemented using hardware, or using a combination of hardware and software functions.

Automatic Transcription/Synthesis Method Descriptions

Figure 3:
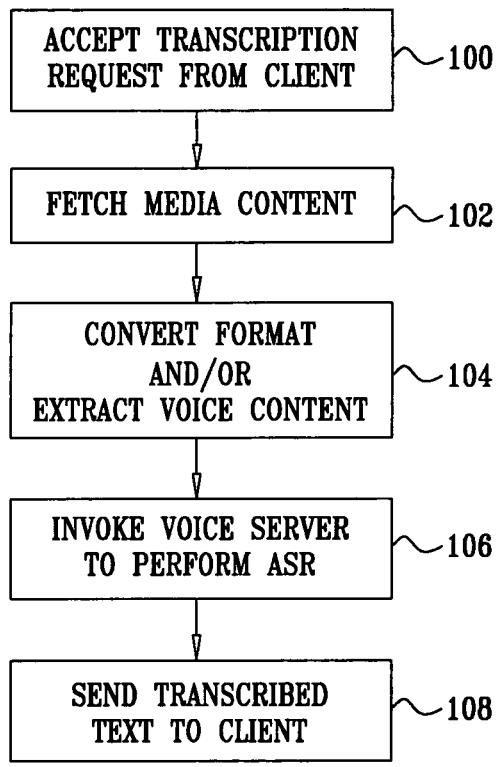
FIG. 3 is a flow chart that schematically illustrates a method for automatic transcription, in accordance with an embodiment of the present invention.

FIG. 3 is a flow chart that schematically illustrates a method for automatic transcription, carried out by voice services gateway 48, in accordance with an embodiment of the present invention. In the description that follows, application 42 is assumed to be a transcription application. The method begins with gateway 48 accepting a transcription request from an off-line client 44, via external interface 56, at a transcription requesting step 100.

Since the transcription process is typically time consuming, in some embodiments, the communication between client 44 and gateway 48 is carried out asynchronously. In these embodiments, gateway 48 checks the validity of the transcription request, adds it to an internal queue and acknowledges to the client that the request has been accepted. At this stage the client may disconnect from the gateway.

The transcription request defines a voice processing task in which specific voice content, or media content, should be transcribed by voice server 24. Gateway 48 fetches the media content in question, at a fetching step 102. In some cases, the media content is stored locally in content depository 72, and gateway 48 is able to access the content using content repository interface 76. Alternatively, the content may be located remotely from gateway 48, in which case it is fetched using one of fetchers 64. In some embodiments, the fetched content is cached in file system cache 68.

Media converter 80 converts the format and/or extracts the voice content from the fetched media content, at a transcription media conversion step 104. Media converter 80 reads the media content either from interface 76 or from cache 68, as appropriate. As described above, if the fetched media content comprises composite video or other complex format, media converter 80 extracts the voice content from the media content. In some embodiments, converter 80 performs any format or protocol conversion needed to format the voice data in accordance with a protocol supported by voice server 24.

Gateway 48 then invokes voice server 24 to apply an ASR process to the voice data, at an ASR step 106. In the exemplary configuration of FIGS. 1 and 2, management module 60, using MRCP+client 84, sends the appropriate MRCP+ control packets to the voice server, so as to initiate the ASR session. Media converter 80 uses RTP interface 88 to send RTP packets carrying the voice data to the voice server. Voice server 24 accepts the voice data and control packets and uses one of its ASR modules 28 to convert the voice into transcribed text.

Generally speaking, transcription applications are often characterized by a large vocabulary which should be recognized by the voice server. By contrast, many conversational applications use only a limited vocabulary. Therefore, in order for voice server 24 to perform well in transcription applications, it is generally desirable that ASR modules 28 use an ASR method capable of recognizing large vocabulary continuous speech, such as various statistical language modeling methods, as are known in the art. Statistical language modeling methods are described, for example, by J. Holmes and W. Holmes in "Speech Synthesis and Recognition," Taylor & Francis, Second Edition, December 2001, pages 196-202.

Having performed the ASR process, server 24 sends the transcribed text back to gateway 48. Gateway 48 sends the transcribed text to the requesting client, at a transcription result step 108. In the asynchronous scenarios described above (in which the client disconnects from the gateway after sending the transcription request), gateway 48 notifies the client when the transcription task is completed, and/or publishes the results (i.e., makes the results available for downloading by the client, such as using a web address).

Figure 4:
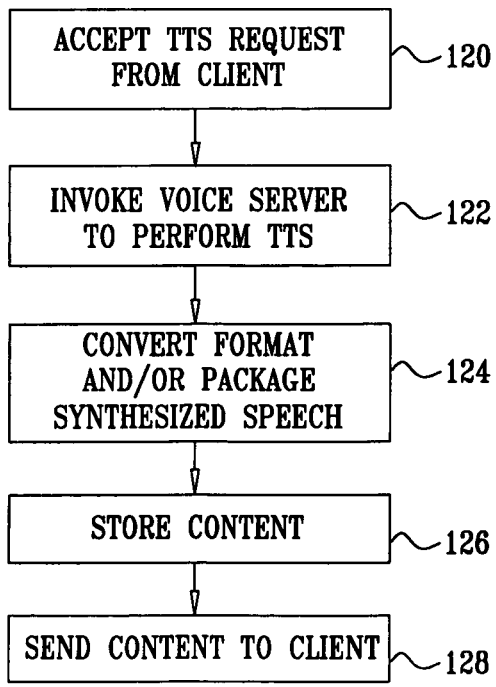
FIG. 4 is a flow chart that schematically illustrates a method for automatic text-to-speech (TTS) conversion, in accordance with an embodiment of the present invention.

FIG. 4 is a flow chart that schematically illustrates a method for automatic text-to-speech (TTS) conversion, in accordance with an embodiment of the present invention. In the description that follows, application 42 is assumed to be a TTS (speech synthesis) application. The method begins with gateway 48 accepting a TTS request from an off-line client 44, via external interface 56, at a TTS requesting step 120. The TTS request defines a voice processing task, typically comprising a request to process textual information. The textual information is requested to be converted to synthesized speech by voice server 24. Similarly to the description of transcription requesting step 100 of FIG. 3 above, in some embodiments client 44 may disconnect from gateway 48 after sending the request and receiving an acknowledgement.

Gateway 48 invokes voice server 24 to apply a TTS process to the textual information of the TTS request, at a TTS step 122. In the exemplary configuration of FIGS. 1 and 2 above, management module 60, using MRCP+client 84, initiates the TTS session by sending the appropriate MRCP+control directives comprising the textual information to the voice server. Voice server 24 uses one of its TTS modules 32 to convert the textual information to synthesized speech, and sends the synthesized speech to gateway 48 using RTP packets.

Media converter 80 accepts the synthesized speech and performs media and/or protocol conversion, at a TTS media conversion step 124. Media converter 80 produces media content comprising the synthesized speech, in accordance with the format and/or protocol used for communicating with the requesting client. If necessary, media converter 80 embeds the synthesized speech into a higher complexity format, such as composite video. In some embodiments, media converter 80 stores the media content in cache 68 or in content repository 72.

Gateway 48 then publishes the media content and/or sends the media content to the requesting client, at a publishing step 128.

Although the methods and systems described herein mainly address off-line transcription and TTS applications, the principles of the present invention can also be used in additional applications that involve using a real-time server to perform off-line tasks, such as audio coding, video coding and speech enhancement applications.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A voice processing system connected to at least one network, the voice processing system configured to communicate with a real-time voice server arranged to process real-time voice processing tasks received over the at least one network according to a first network communication protocol, the voice processing system comprising:
   a gateway processor, arranged to accept from a client a request to perform an off-line voice processing task, the request received over the at least one network according to a second network communication protocol, the gateway processor configured to convert the off-line voice processing task into an equivalent real-time voice processing task of the first network communication protocol and to provide the equivalent real-time voice processing task to the real-time voice server over the at least one network according to the first network communication protocol for processing of the equivalent real-time voice processing task, the gateway processor further configured to output a result of the processing of the equivalent real-time voice processing task to the client.

2. The system according to claim 1, wherein the off-line voice processing task comprises a request to transcribe voice content, wherein the real-time voice server is arranged to convert the voice content to transcribed text, and wherein the gateway processor is arranged to output the result comprising the transcribed text.

3. The system according to claim 1, wherein the off-line voice processing task comprises a request to process textual information, wherein the real-time voice server is arranged to convert the textual information to synthesized speech, and wherein the gateway processor is arranged to output the result comprising the synthesized, speech.

4. The system according to claim 1, wherein the real-time voice server is arranged to apply any one of or any combination of two or more of an automatic speech recognition (ASR) process, a text-to-speech (TTS) conversion process, a speaker identification (SI) process and a speaker verification (SV) process so as to process the equivalent real-time voice processing task.

5. The system according to claim 1, wherein the real-time voice server and the gateway processor exchange control messages using a control protocol comprising one or more commands for handling off-line media.

6. The system according to claim 1, further comprising a media converter for converting between the second network communication protocol and/or a first media format associated with the off-line voice processing task and the first network communication protocol and/or a second media format associated with the equivalent real-time voice processing task.

7. The system according to claim 6, wherein the second media format comprises a voice data format supported by the voice server and the first media format comprises a voice data format for rich media or multimedia.

8. The system according to claim 6, wherein one of the first and second media formats comprises rich media comprising voice content grouped with additional content, and wherein the media converter is arranged to extract the voice content from the rich media content and/or embed the voice content into the rich media content.

9. The system according to claim 1, wherein the gateway processor is arranged to output the result of the equivalent real-time voice processing task by publishing the result and/or sending the result to the client over the at least one network.

10. The voice processing system of claim 1, wherein the first network communication protocol comprises a telephony-oriented protocol and the second network communication protocol comprises a web-access protocol.

11. The voice processing system of claim 10, wherein the first network communication protocol comprises a real-time transfer protocol (RTP) and/or a media resource control protocol (MRCP).

12. The voice processing system of claim 10, wherein the second network communication protocol comprises a hypertext transfer protocol (HTTP) or an internet protocol (IP).

13. The voice processing system of claim 1, wherein the result is sent to the client according to the second network communication protocol.

14. A gateway processor connected to at least one network, the gateway processor configured to operate in conjunction with a real-time voice server that is configured to process real-time voice processing tasks received over the at least one network according to a first network communication protocol, the gateway processor comprising:
a client interface which is arranged to receive from a client over the at least one network a request to perform an off-line voice processing task according to a second network communication protocol;
a media converter which is arranged to convert the off-line voice processing task into an equivalent real-time voice processing task of the first network communication protocol; and
a management module which is arranged to provide the equivalent real-time voice processing task to the real-time voice server over the at least one network according to the first network communication protocol for processing, by the real-time voice server, the equivalent real-time voice processing task, and to output a result of the processing of the equivalent real-time voice processing task to the client.

15. The gateway processor of claim 14, wherein the first network communication protocol comprises a telephony-oriented protocol and the second network communication protocol comprises a web-access protocol.

16. The gateway processor of claim 15, wherein the first network communication protocol comprises a real-time transfer protocol (RTP) and/or a media resource control protocol (MRCP).

17. The gateway processor of claim 15, wherein the second network communication protocol comprises a hypertext transfer protocol (HTTP) or an internet protocol (IP).

18. A method for voice processing, comprising:
receiving, over at least one network, a request from a client to perform an off-line voice processing task according to a first network communication protocol;
converting the off-line voice processing task of the first network communication protocol into an equivalent real-time voice processing task of a second network communication protocol;
providing the equivalent real-time voice processing task to a real-time voice server over the at least one network according to the second network communication protocol for processing the equivalent real-time voice processing task; and
outputting a result of the processing of the equivalent real-time voice processing task to the client.

19. The method according to claim 18, wherein accepting the request comprises accepting a request to transcribe voice content, wherein invoking the real-time voice server comprises requesting the real-time voice server to convert the voice content to transcribed text, and wherein outputting the result comprising outputting the transcribed text.

20. The method according to claim 18, wherein accepting the request comprises accepting a request to process textual information, wherein invoking the real-time voice server comprises requesting the real-time voice server to convert the textual information into synthesized speech, and wherein outputting the result comprising outputting the synthesized speech.

21. The method according to claim 18, wherein invoking the real-time voice server comprises causing the real-time voice server to apply one or any combination of two or more of an automatic speech recognition (ASR) process, a text-to-speech (TTS) conversion process, a speaker identification (SI) process and a speaker verification (SV) process so as to process the equivalent real-time voice processing task.

22. The method according to claim 18, wherein invoking the real-time voice server comprises exchanging control messages between the real-time voice server and the gateway processor using a control protocol comprising one or more commands for handling off-line media.

23. The method according to claim 18, wherein converting the off-line voice processing task into the equivalent real-time voice processing task comprises converting between the first network communication protocol and/or a first media format associated with the off-line voice processing task and the second network communication protocol and/or a second media format associated with the equivalent real-time voice processing task.

24. The method according to claim 23, wherein the second media format comprises a voice data format supported by the voice server and the first media format comprises a voice data format for rich media or multimedia.

25. The method according to claim 23, wherein one of the first and second media formats comprises rich media comprising voice content grouped with additional content, and wherein converting the media format comprises extracting the voice content from the rich media content and/or embedding the voice content into the rich media.

26. The method according to claim 18, wherein outputting the result of the equivalent real-time voice processing task comprises publishing the result and/or sending the result to the client over the at least one network.

27. The method of claim 18, wherein the converting the off-line task comprises receiving voice data and performing a format and protocol conversion to provide the voice data to the real-time voice server in accordance with a protocol and format supported by the real-time voice server; and the invoking the real-time voice server comprises formatting control information associated with the voice data and providing the formatted control information to the real-time voice server.

28. The method of claim 27, wherein the converting the off-line task comprises performing a protocol conversion to provide the voice data to the real-time voice server in accordance with a real time protocol (RTP).

29. The method of claim 27, wherein the converting the off-line task comprises performing a format conversion of the voice data to provide the voice data to the real-time voice server in real time protocol (RTP) data packets.

30. The method of claim 27, wherein the invoking the real-time voice server comprises formatting control information according to an extended media resource control protocol (MRCP+).

31. The method of claim 18, wherein the first network communication protocol comprises a telephony-oriented protocol and the second network communication protocol comprises a web-access protocol.

32. The method of claim 31, wherein the first network communication protocol comprises a real-time transfer protocol (RTP) and/or a media resource control protocol (MRCP).

33. The method of claim 31, wherein the second network communication protocol comprises a hypertext transfer protocol (HTTP) or an internet protocol (IP).

34. The method of claim 18, wherein outputting the result comprises sending the result to the client according to the second network communication protocol.

35. A computer software product for processing voice, the product comprising a non-transitory computer-readable medium, in which program instructions are stored, which instructions, when read by a computer, cause the computer to:
receive, over at least one network from a client a request to perform an off-line voice processing task according to a first network communication protocol;
convert the off-line voice processing task of the first network communication protocol into an equivalent real-time voice processing task of a second network communication protocol;
provide the equivalent real-time voice processing task to a real-time voice server over the at least one network according to the second network communication protocol for processing the equivalent real-time voice processing task; and
output a result of the processing of the equivalent real-time voice processing task to the client.

36. The product according to claim 35, wherein the instructions cause the computer to convert between the first network communication protocol and/or a first media format associated with the off-line voice processing task and the second network communication protocol and/or a second media format associated with the equivalent real-time voice processing task.

37. The product according to claim 36, wherein one of the first and second media formats comprises rich media comprising voice content grouped with additional content, and wherein the instructions cause the computer to perform either one of or both of extracting the voice content from the rich media content and embedding the voice content into the rich media.

38. The product according to claim 36, wherein the second media format comprises a voice data format supported by the voice server and the first media format comprises a voice data format for rich media or multimedia.

39. The computer software product of claim 35, wherein the first network communication protocol comprises a telephony-oriented protocol and the second network communication protocol comprises a web-access protocol.

40. The computer software product of claim 39, wherein the first network communication protocol comprises a real-time transfer protocol (RTP) and/or a media resource control protocol (MRCP).

41. The computer software product of claim 39, wherein the second network communication protocol comprises a hypertext transfer protocol (HTTP) or an internet protocol (IP).

* * * * *